(12) United States Patent
Pottinger

(10) Patent No.: US 10,037,333 B2
(45) Date of Patent: Jul. 31, 2018

(54) SYSTEMS AND METHODS FOR DETERMINING CONTENT SIMILARITY

(71) Applicant: Facebook, Inc., Menlo Park, CA (US)

(72) Inventor: Trevor M. Pottinger, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 301 days.

(21) Appl. No.: 14/818,979

(22) Filed: Aug. 5, 2015

(65) Prior Publication Data

US 2017/0039211 A1 Feb. 9, 2017

(51) Int. Cl.
  G06F 17/30 (2006.01)
  H04L 29/06 (2006.01)

(52) U.S. Cl.
  CPC ...... *G06F 17/30109* (2013.01); *H04L 63/145* (2013.01)

(58) Field of Classification Search
  USPC ............... 707/607, 705, 687, 790, 821, 964
  See application file for complete search history.

(56) References Cited

U.S. PATENT DOCUMENTS

2014/0279738 A1* 9/2014 Mahler ............... G06N 99/005
706/12

OTHER PUBLICATIONS

Gong, Yunchao et al., "Iterative Quantization: A Procrustean Approach to Learning Binary Codes for Large-Scale Image Retrieval," IEEE Transactions on Pattern Analysis and Machine Intelligence, vol. 35, Iss. 12, pp. 2916-2929, Sep. 6, 2012.

* cited by examiner

*Primary Examiner* — Sana A Al-Hashemi
(74) *Attorney, Agent, or Firm* — Sheppard Mullin Richter & Hampton LLP

(57) ABSTRACT

Systems, methods, and non-transitory computer-readable media can obtain at least one content item for which a hash value is to be generated. A set of n-grams can be generated based at least in part on the at least one content item. A first vector can be generated based at least in part on the set of n-grams, wherein the vector maintains respective counts of n-grams in the set of n-grams. A quantized vector can be determined based at least in part on the first vector and one or more parameters. The hash value for the at least one content item can be generated based at least in part on the quantized vector.

20 Claims, 8 Drawing Sheets

SYSTEMS AND METHODS FOR DETERMINING CONTENT SIMILARITY

FIELD OF THE INVENTION

The present technology relates to the field of identifying similar content. More particularly, the present technology relates to techniques for generating hash codes for various content to identify content that is identical or similar.

BACKGROUND

Today, people often utilize computing devices (or systems) for a wide variety of purposes. Users can operate their computing devices to, for example, interact with one another, create content, share information, and access information. In some instances, computing devices can be used to generate hash values, or digests, for content items (e.g., strings of text and/or files, such as text files, software programs, program files, executable files, etc.). Each hash value that is generated for a content item can provide a compact digital fingerprint of the item. The digital fingerprint, or hash value, may be rendered as a hexadecimal string, for example. Some examples of hash functions include the MD6 message-digest algorithm and SHA-1.

Hash values can be used to determine whether one content item is identical to another. For example, a hash value for a file "test1.txt" may be "595f44fec1e92a71d3e9e77456ba80d1". If a hash value generated for a different file "test2.txt" is also "595f44fec1e92a71d3e9e77456ba80d1," then a determination can be made that the two files have identical subject matter. Under conventional approaches, however, hash values typically do not provide a measure of similarity between content items. That is, the hash values generated for two similar content items can vary greatly, thereby making similar content items difficult to identify.

SUMMARY

Various embodiments of the present disclosure can include systems, methods, and non-transitory computer readable media configured to obtain at least one content item for which a hash value is to be generated. A set of n-grams can be generated based at least in part on the at least one content item. A first vector can be generated based at least in part on the set of n-grams, wherein the vector maintains respective counts of n-grams in the set of n-grams. A quantized vector can be determined based at least in part on the first vector and one or more parameters. The hash value for the at least one content item can be generated based at least in part on the quantized vector.

In an embodiment, a determination can be made that the at least one content item includes structured content. A parse tree can be generated based at least in part on the content item. The set of n-grams can be determined based at least in part on the parse tree.

In an embodiment, the first vector is a count-min sketch (CM sketch) vector that is associated with at least one hash function. Each n-gram in the set of n-grams can be hashed to at least one element in the CM sketch vector using the at least one hash function. A respective value corresponding to the at least one element can be incremented based at least in part on a number of occurrences of the n-gram in the content item.

In an embodiment, a normalized vector can be determined based at least in part on the first vector and at least one normalization vector. The normalized vector can be modified based at least in part on at least one a rotation matrix.

In an embodiment, the normalized vector can be determined by subtracting the first vector by the at least one normalization vector.

In an embodiment, the normalized vector can be multiplied by the at least one rotation matrix.

In an embodiment, a binarized vector can be determined based at least in part on the quantized vector.

In an embodiment, the binarized vector can be converted to hexadecimal notation.

In an embodiment, a respective value for each element in the quantized vector having a positive value can be modified to 1. A respective value for each element in the quantized vector having a negative value can be modified to 0.

In an embodiment, a determination can be made that the hash value for the content item matches a hash value generated for a different content item. A determination can be made that the content item and the different content item contain similar content or structured content.

In an embodiment, the at least one content item is one of: a string, source code, object code, bytecode, machine code, structured content, text file, binary file, system file, software program, program file, or executable file.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
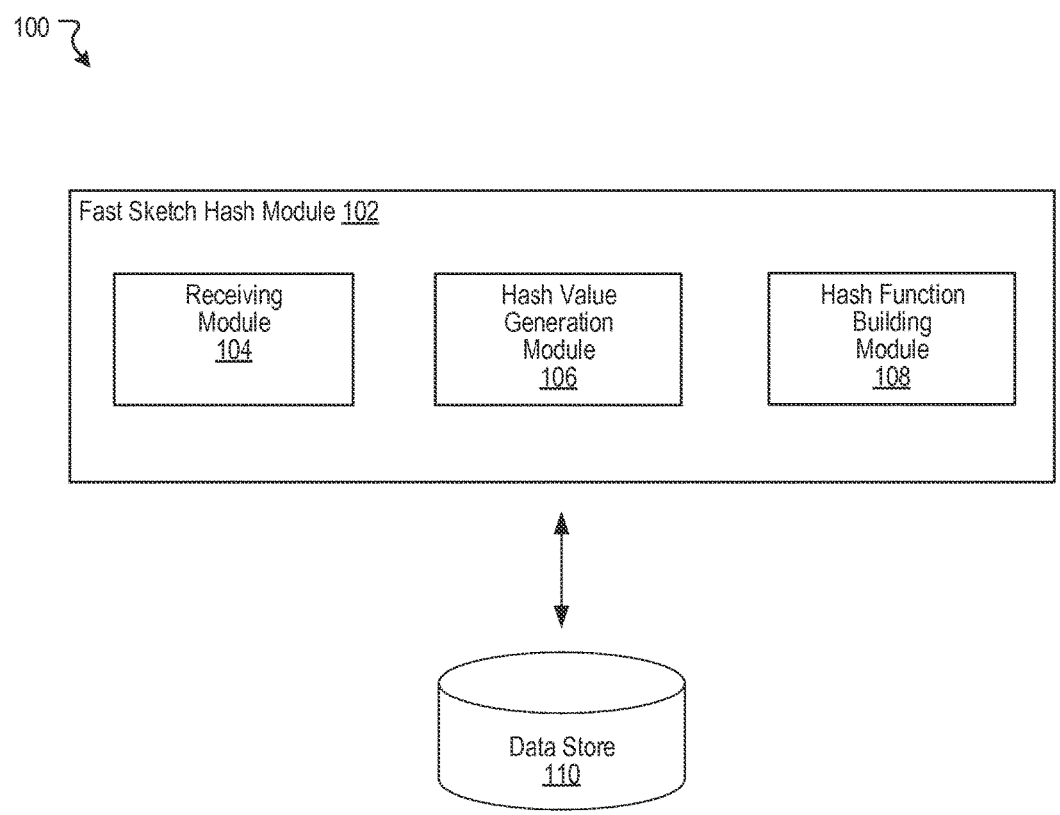
FIG. 1 illustrates an example system including an example fast sketch hash module configured to generate hash values, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Determining Content Similarity

People use computing devices (or systems) for a wide variety of purposes. As mentioned, under conventional approaches, various hash functions can be used to generate hash values, or digests, for various types of content items. Such content items may be strings (e.g., text strings) or files (e.g., text files, binary files, system files, software programs, program files, executable files, etc.). Each hash value that is generated for a content item can provide a compact digital signature, or fingerprint, of the content item and the fingerprint, or hash value, may be rendered in hexadecimal notation. Hash values can be used to determine whether one content item is identical to another. Under conventional approaches, however, hash values typically do not provide a measure of similarity between content item. That is, the hash values generated for two similar content item can vary greatly, thereby making content item that are similar, for example, based on similar content or syntax, difficult to identify. Such shortcomings, therefore, make it difficult to identify malicious content item that may appear to be different but that still perform the same malicious operations.

An improved approach overcomes the foregoing and other disadvantages associated with conventional approaches. In general, a hash function can be built for generating similarity-preserving hash values for a particular type of content item. The hash function can be used to generate hash values for content items that correspond to the particular type. For example, a hash function can be built to generate hash values for files that include JavaScript code. In other words, this hash function can be built to generate hash values based on the respective parse trees, or syntax, corresponding to the different JavaScript files. The hash values generated by this hash function can be used to determine whether any files including JavaScript code are identical or similar to one another. In another example, a separate hash function can be built to generate hash values for files that include text. Unlike content items that include structured content (e.g., source code, object code, bytecode, machine code, HTML, XML, etc.) that may need to be parsed, this hash function can be built to generate hash values based on the respective content corresponding to the different text files. The hash values generated by this hash function can be used to determine whether any text files are identical or similar to one another.

To generate the hash value for a text file, for example, a set of n-grams using the contents of the file can be generated. For example, for a text file that includes the string "banana," the unigrams "b", "a", "n", "a", "n", and "a" can be generated. The type of n-grams that are generated can vary depending on the implementation. Thus, in an implementation that utilizes bigrams, the bigrams "ba", "an", "na", "an" and "na" can be generated. The frequency (e.g., count) at which n-grams appear can be determined. Using the bigrams example from above, there is one instance of the bigram "ba", two instances of the bigram "an", and two instances of the bigram "na". In various embodiments, a count-min sketch (CM sketch) probabilistic data structure can be utilized to track the respective counts of n-grams. The CM sketch can consume a stream of events (e.g., n-grams), one at a time, and count the frequency of the different types of events in the stream. In various implementations, the CM sketch can be queried for the frequency of a particular event (e.g., n-gram) and, in response to the query, the CM sketch can provide the frequency of the particular event.

Typically, the CM sketch is a vector, or array, that can be associated with one or more hash functions (e.g., perfect hash functions), depending on the implementation. For example, in some embodiments, a first hash function can be used to map an n-gram (e.g., the bigram "na") to an element in the CM sketch vector. Next, a second hash function can be used to map the same n-gram (i.e., the bigram "na") to another element in the CM sketch vector. The respective values of the elements to which the n-gram is mapped can be incremented based on the frequency, or count, of that n-gram in the file being evaluated. Thus, the value for the element to which the bigram "na" was hashed by the first hash function can be incremented by two (2) since there were two instances of the bigram in the string "banana". Similarly, the value for element to which the bigram "na" was hashed by the second hash function can also be incremented by two (2) since there were two instances of the bigram in the string "banana".

Once each of the n-grams have been mapped to elements in the CM sketch vector, the resulting vector can be iteratively quantized. In some embodiments, the resulting vector can be iteratively quantized, for example, by subtracting the resulting vector by a normalization vector. Next, the normalized vector can be multiplied by a rotation matrix to determine a quantized vector. The quantized vector can be converted to hexadecimal notation to render the hash value.

In various embodiments, the approach described above can be utilized for generating hash values for content items that contain structured content (e.g., source code, object code, bytecode, machine code, binary files, system files, software programs, program files, executable files, HTML, XML, etc.) by determining a parse tree based on the structured content included in the content item and then determining n-grams using the parse tree. By utilizing such an approach, similarity-preserving hash values can be generated for various types of content items so that content items that are similar can easily be identified. In one example, any files that are similar to a file that has previously been identified as being a virus can be identified and isolated using the approaches described herein. The generated hash values can be relatively compact. For example, each hash value can be represented using a reduced string, or bit, size. By being compact in size, the hash values can easily be shared with third parties, for example, for purposes of identifying similar content items. Further, by being compact, less storage and/or computation resources can be needed to perform the various approaches described herein. In other words, the approaches described herein can allow for quickly comparing hash values at scale.

FIG. 1 illustrates an example system 100 including an example fast sketch hash module 102 configured to generate hash values, according to an embodiment of the present disclosure. As shown in the example of FIG. 1, the fast sketch hash module 102 can include a receiving module 104, a hash value generation module 106, and a hash function building module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the fast sketch hash module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the fast sketch hash module 102 can be implemented, in part or in whole, as software running on one or more computing devices or systems, such as on a user computing device or client computing system. For example, the fast sketch hash module 102, or at least a portion thereof, can be implemented as or within an application (e.g., app), a program, or an applet, etc., running on a user computing device or a client computing system, such as the user device 710 of FIG. 7. Further, the fast sketch hash module 102, or at least a portion thereof, can be implemented using one or more computing devices or systems that include one or more servers, such as network servers or cloud servers. In some instances, the fast sketch hash module 102 can, in part or in whole, be implemented within or configured to operate in conjunction with a social networking system (or service), such as the social networking system 730 of FIG. 7. It should be understood that there can be many variations or other possibilities.

In various embodiments, the fast sketch hash module 102 can be configured to generate hash values for various types of content items. For example, the fast sketch hash module 102 can be configured to utilize various hash functions and other parameters (e.g., normalization vector, rotation matrix, etc.) to generate hash values for content items. As mentioned, such content items may be strings (e.g., text strings) or files (e.g., text files, binary files, system files, software programs, program files, executable files, etc.). Each hash value can serve as a digital fingerprint or signature that can be used to identify identical, or similar, content items.

The receiving module 104 can be configured to receive or obtain content items for which hash values are to be generated. For example, a user that wants to determine whether a set of files match one another can submit the files to the system 100. When determining whether one content item matches another, the approaches described herein can determine whether the two content items are identical or similar to one another within some threshold level of similarity. The receiving module 104 can receive and store the submitted files, for example, in the data store 110, for further processing.

The hash value generation module 106 can be configured to generate hash values for content items, as described above. For example, the hash value generation module 106 can generate a hash value for a file based on the contents of the file or based on the structured content, in the file. More details regarding the hash value generation module 106 will be provided below in reference to FIG. 2.

The hash function building module 108 can be configured to build hash functions and other parameters, such as normalization vectors and/or rotation matrices, for use in generating hash values. More details regarding the hash function building module 108 will be provided below in reference to FIG. 3.

In some embodiments, the fast sketch hash module 102 can be configured to communicate and/or operate with the at least one data store 110 in the example system 100. The at least one data store 110 can be configured to store and maintain various types of data. In various embodiments, the at least one data store 110 can store data relevant to function and operation of the fast sketch hash module 102. Examples of such data are content items for which hash values are to be generated as well as normalization vectors and rotation matrices that can be utilized by a hash function when generating the hash values for content items. In some implementations, the at least one data store 110 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user specified settings, content produced or posted by users, and various other types of user data. It should be appreciated that there can be many variations or other possibilities.

Figure 2:
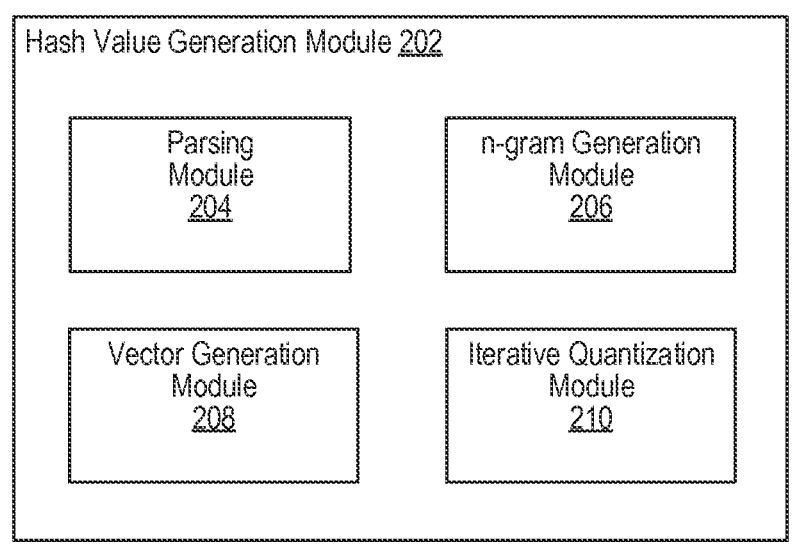
FIG. 2 illustrates an example hash value generation module configured to generate hash values, according to an embodiment of the present disclosure.

FIG. 2 illustrates an example hash value generation module 202 configured to generate hash values, according to an embodiment of the present disclosure. In some embodiments, the hash value generation module 106 of FIG. 1 can be implemented with the hash value generation module 202. As shown in the example of FIG. 2, the hash value generation module 202 can include a parsing module 204, an n-gram generation module 206, a vector generation module 208, and an iterative quantization module 210.

As mentioned, the hash value generation module 202 can be configured to generate hash values for various types of content items. When computing hash values for a content item, the hash value generation module 202 can submit the content item to the n-gram generation module 206 for processing. The n-gram generation module 206 can generate a respective set of n-grams for the content item. The type of n-grams that are generated (e.g., unigrams, bigrams, trigrams, etc.) can vary depending on the implementation. For example, for content items that do not include structured content, such as a string or text file, the n-gram generation module 206 can generate a set of n-grams using the string or the contents of the text file. For example, if a text file contains the string "banana smoothie", the n-gram generation module 206 can generate the following bigrams "ba", "an", "na", "an", "na", "a", "s", "sm", "mo", "oo", "ot", "th", "hi", and "ie".

In some instances, content items can include structured content (e.g., source code, object code, bytecode, machine code, binary files, system files, software programs, program files, executable files, HTML, XML, etc.). In such instances, these content items can be pre-processed by the parsing module 204 to generate a respective parse tree for the content item prior to generating the n-grams for the content items. The parse tree for a given content item can provide an ordered, rooted tree that represents the syntactic structure of the content item. In various embodiments, the parse tree for a content item can be created using generally known techniques and/or software, such as Esprima. Once the parse tree is created, the parsing module 204 tree can normalize the parse tree to remove any content that does not affect the overall structure of the content item. For example, with respect to a program file as the content item, any comments and/or values of variables that do not change the structure of the program file can be removed. In one example, for the variable declaration "var='hello world'", the value "hello world" can be ignored and/or removed from the parse tree. Once normalized, the parse tree can be submitted to the n-gram generation module 206 for determining a set of n-grams for the content item.

When generating n-grams for a content item that includes structured content, the n-gram generation module 206 can determine the n-grams based on the parse tree that was generated for the content item. For example, a content item can include the following source code:

```
var tips = [
    "Click on a node with a '+' to expand it",
    "Hovering over a node highlights the \
    corresponding part in the source code",
    "Click the expand button to expand the entire sub-tree"
];
```

In this example, this source code can be converted into the following parse tree:

```
- Program {
  type: "Program"
  - body: [
  - VariableDeclaration {
      type: "VariableDeclaration"
    - declarations: [
        -VariableDeclarator {
        type: "VariableDeclarator"
        - id: Identifier {
          type: "Identifier"
          name: "tips"
        }
        - init: ArrayExpression {
        type: "ArrayExpression"
        - elements: [
            - Literal {
                type: "Literal"
                value: "Click on a node with a '+' to expand it"
            }
            - Literal {
                type: "Literal"
                value: "Hovering over a node highlights the corresponding part in the source code"
            }
            - Literal {
                type: "Literal"
                value: "Click the expand button to expand the entire sub-tree"
            }
        ]
    ...
}
```

Figure 5:
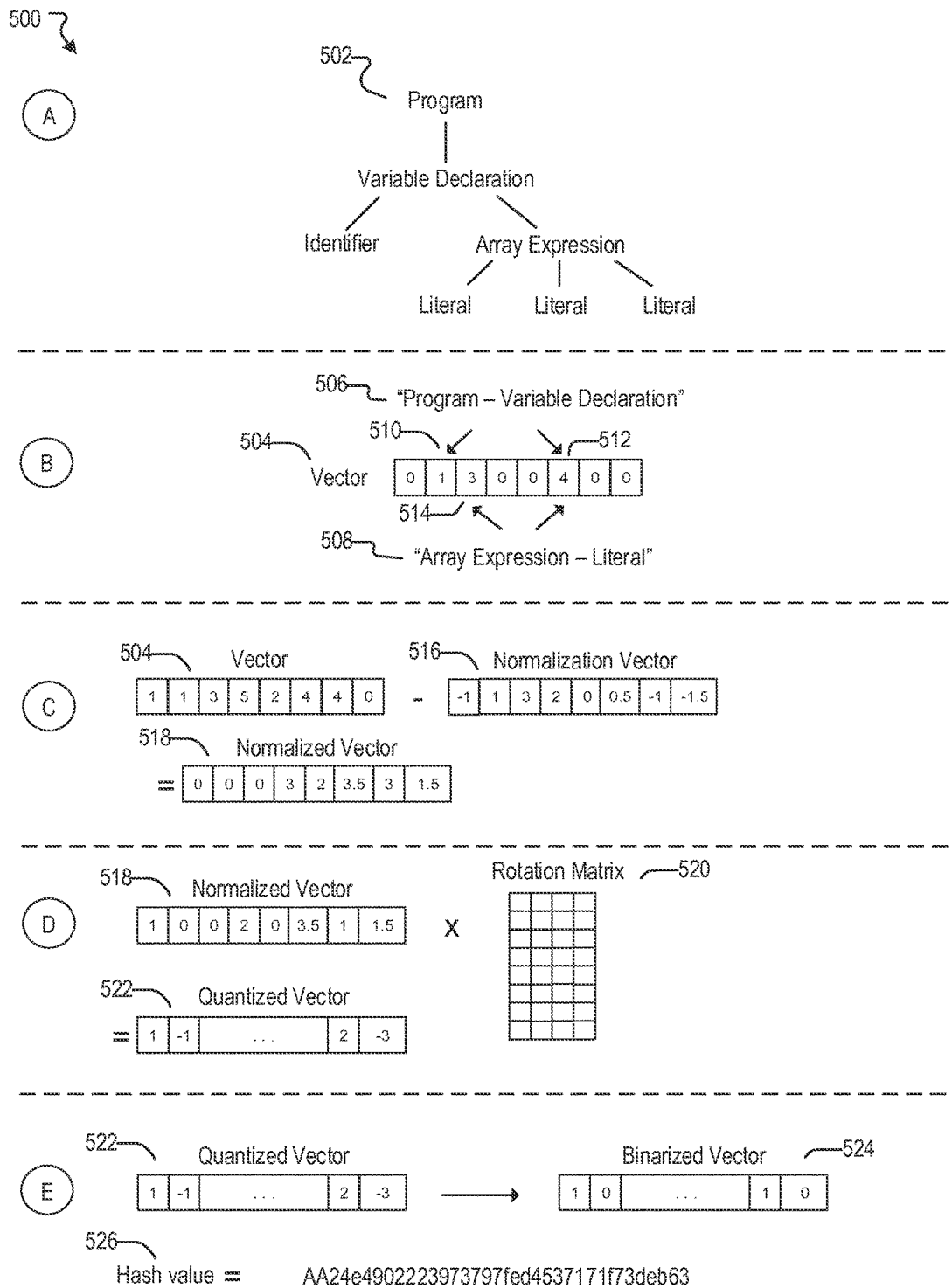
FIG. 5 illustrates an example process for generating a hash value for a content item, according to various embodiments of the present disclosure.

A different representation of this parse tree is illustrated in FIG. 5 as parse tree 502. In this example, assuming bigrams are being generated, the n-gram generation module 206 can generate the following bigram parent-child relationships: "Program-VariableDeclaration", "VariableDeclaration-Identifier", "VariableDeclaration-ArrayExpression", "ArrayExpression-Literal", "ArrayExpression-Literal", and "ArrayExpression-Literal". The n-gram generation module 206 can also generate the following bigram sibling relationships: "Identifier-ArrayExpression", "Literal-Literal", "Literal-Literal", and "Literal-Literal".

The vector generation module 208 can count the occurrences of each n-gram that is produced by the n-gram generation module 206. For example, for the bigrams "ba", "an", "na", "an", and "na", the vector generation module 208 can determine that there is one instance of the bigram "ba", two instances of the bigram "an", and two instances of the bigram "na". Similarly, using the example above, the vector generation module 208 can determine that the parent-child relationships "Program-VariableDeclaration", "VariableDeclaration-Identifier", and "VariableDeclaration-ArrayExpression" each occur once and the parent-child relationship "ArrayExpression-Literal" occurs three times.

In various embodiments, the vector generation module 208 tracks the respective counts of n-grams using a count-min sketch (CM sketch) probabilistic data structure. As mentioned, the CM sketch can consume a stream of events (e.g., n-grams), one at a time, and count the frequency of the different types of events in the stream. In various implementations, the CM sketch can be queried for the frequency of a particular event (e.g., n-gram) and, in response to the query, the CM sketch can provide the frequency of the particular event. The CM sketch can be implemented as a vector, or array, that is associated with one or more hash functions. The hash functions can be perfect hash functions. In various embodiments, a perfect hash function is a hash function that maps distinct n-grams to elements of a vector, or array, with no collisions. The number of elements of the array can be specified or be determined based on the number of n-grams that were determined for the file. Further, the value of each element of the array can initially be set to zero (0).

In some embodiments, each n-gram is hashed to two elements of the CM sketch vector using two different hash functions. Using the parent-child relationships from above as an example, the vector generation module 208 can utilize a first hash function to hash the bigram "ArrayExpression-Literal" to a first element in the array. The value corresponding to the first element can be incremented by three to count the three occurrences of the "ArrayExpression-Literal" bigram. Similarly, a second hash function can be used to hash "ArrayExpression-Literal" to a second element in the array. Further, the value corresponding to the second element can also be incremented by three to count the three occurrences of the "ArrayExpression-Literal" bigram.

A similar approach can be used when generating the CM sketch for a content item that is a string or text file. Thus, using the string "banana" as an example, the vector generation module 208 can utilize a first hash function to hash the bigram "na" to a first element in the array. The value corresponding to the first element can be incremented by two to count the two occurrences of the "na" bigram. Similarly, a second hash function can be used to hash the bigram "na" to a second element in the array. Further, the value corresponding to the second element can also be incremented by two to count the two occurrences of the "na" bigram.

After the CM sketch vector is created, a frequency or count for an n-gram can be determined by querying the CM sketch vector. For example, to determine a count for the "ArrayExpression-Literal" bigram, the hash value generation module 202 can determine the minimum of (i) the value corresponding to the first element and (ii) the value corresponding to the second element. For example, if the first element had a value of 4 and the second element had a value of 5, then the count for the "ArrayExpression-Literal" bigram would be 4.

Once the respective counts of the n-grams generated by the n-gram generation module 206 have been accounted for in the CM sketch vector, the iterative quantization module 210 can be utilized to apply iterative quantization techniques for purposes of generate the hash value for the content item. An example approach for applying iterative quantization is described in Y. Gong, S. Lazebnik, A. Gordo, and F. Perronnin "Iterative quantization: A Procrustean approach to learning binary hash codes for large-scale image retrieval," *Pattern Analysis and Machine Intelligence* (*PAMI*), 2012, which is incorporated herein by reference. For example, the iterative quantization module 210 can be configured to generate the hash value by subtracting the CM sketch vector by a normalization vector. The normalization vector can be generated, for example, by the hash function building module 302 as described in reference to FIG. 3. Further, each normalization vector can correspond to a type of content item for which the hash value is being generated. For example, a first normalization vector can be utilized for content items that include text while a different, second normalization vector can be utilized for content items that include structured content, such as JavaScript files or browser access relative filing (BARF) files. Once a normalized vector is determined after subtracting the CM sketch vector by the normalization vector, the normalized vector can be multiplied by a rotation matrix. Like the normalization vector, the rotation matrix can be generated, for example, by the hash function building module 302 as described in reference to FIG. 3, and can correspond to the type of content item for which the hash value is being generated.

After multiplying, the resulting vector can be converted to binary form by updating the respective values for each element of the vector that has a positive value to 1 and the respective values for each element of the vector that has a negative value to 0. Once binarized, the vector, which is now a series of ones and zeros, can be converted to hexadecimal notation to produce the resulting hash value for the content item.

Figure 3:
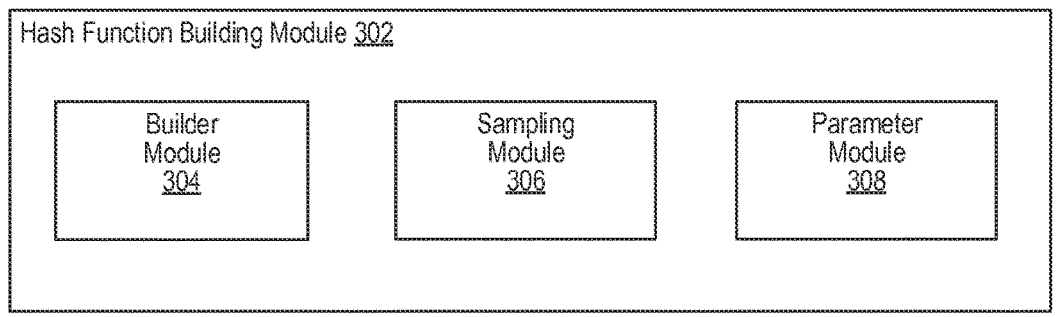
FIG. 3 illustrates an example hash function building module configured to generate parameters for hash functions, according to an embodiment of the present disclosure.

FIG. 3 illustrates an example hash function building module 302 configured to generate parameters for hash functions, according to an embodiment of the present disclosure. In some embodiments, the hash function building module 108 of FIG. 1 can be implemented with the hash function building module 302. As shown in the example of FIG. 2, the hash function building module 302 can include a builder module 304, a sampling module 306, and a parameter module 308.

The hash function building module 302 can be configured to build hash functions and other parameters, such as normalization vectors and/or rotation matrices, for use in generating hash values. As mentioned, such parameters can be generated using the approaches described in Y. Gong, S. Lazebnik, A. Gordo, and F. Perronnin "Iterative quantization: A Procrustean approach to learning binary hash codes for large-scale image retrieval," *Pattern Analysis and Machine Intelligence* (*PAMI*), 2012, which is incorporated herein by reference.

The builder module 304 can be configured to determine various parameters for building hash functions. Each hash function can be built for processing a particular type of content item. For example, a first hash function can be built for generating hash values for text files while a different, second hash function can be built for generating hash values for JavaScript files. In various embodiments, the parameters for building a hash function can be predetermined and/or specified by a user. For example, when building a hash function, the builder module 304 can utilize parameters such as the type of n-grams (e.g., unigrams, bigrams, trigrams, etc.) to be generated, for example, by the n-gram generation module 206 of FIG. 2. The number of hash functions to use to hash values for a given count-min sketch (CM sketch) vector can be specified. Similarly, the size (e.g., number of elements) of the count-min sketch vector can also be specified.

Once such parameters are obtained, the sampling module 306 can be utilized to generate respective CM sketch vectors for a number of samples (e.g., 1,000 to 10,000 samples). The samples may be, for example, content items that include strings or text or content items that include structured content, depending on the type of hash function being built. That is, for each sample containing strings or text, the sampling module 306 can generate a corresponding CM sketch vector based on the n-grams generated for the sample. The corresponding CM sketch vectors for each sample can be used to obtain at least one normalization vector and/or rotation matrix from the parameter module 308. That is, the parameter module 308 can evaluate the CM sketch vectors for the different samples and determine at least one corresponding normalization vector and rotation matrix for the hash function being built. The generated normalization vector and rotation matrix can then be utilized by the hash function for which they were generated to produce hash values for various content items. For any samples that include structured content, the sampling module 306 can generate a corresponding CM sketch vector by determining a parse tree for the sample and then generating n-grams for the sample. The corresponding vectors for each sample can be used to obtain a normalization vector and/or rotation matrix from the parameter module 308, as described above. Thus, the hash function building module 302 can generate different hash functions for determining similarity between different types of content items.

The normalization vector and rotation matrix corresponding to a hash function can be shared with third-parties. In such instances, the third-parties can utilize the normalization vector and rotation matrix, together with the corresponding hash function, to produce the same hash values that would be generated, for example, by the hash value generation module 202 of FIG. 2. In other words, by sharing and utilizing the hash function and the corresponding normalization vector and rotation matrix, a first entity can generate the same hash value for a particular content item that would be generated by a second entity while utilizing the hash function and corresponding normalization vector and rotation matrix. Such functionality can be useful, for example, when the first entity identifies a malicious content item. In such instances, the first entity can provide the second entity with a copy of the hash value that was generated for the malicious content item. Using the hash value, the second entity can determine hash values for various other content items to determine whether any of those content items are identical or similar to the malicious content item.

Figure 4:
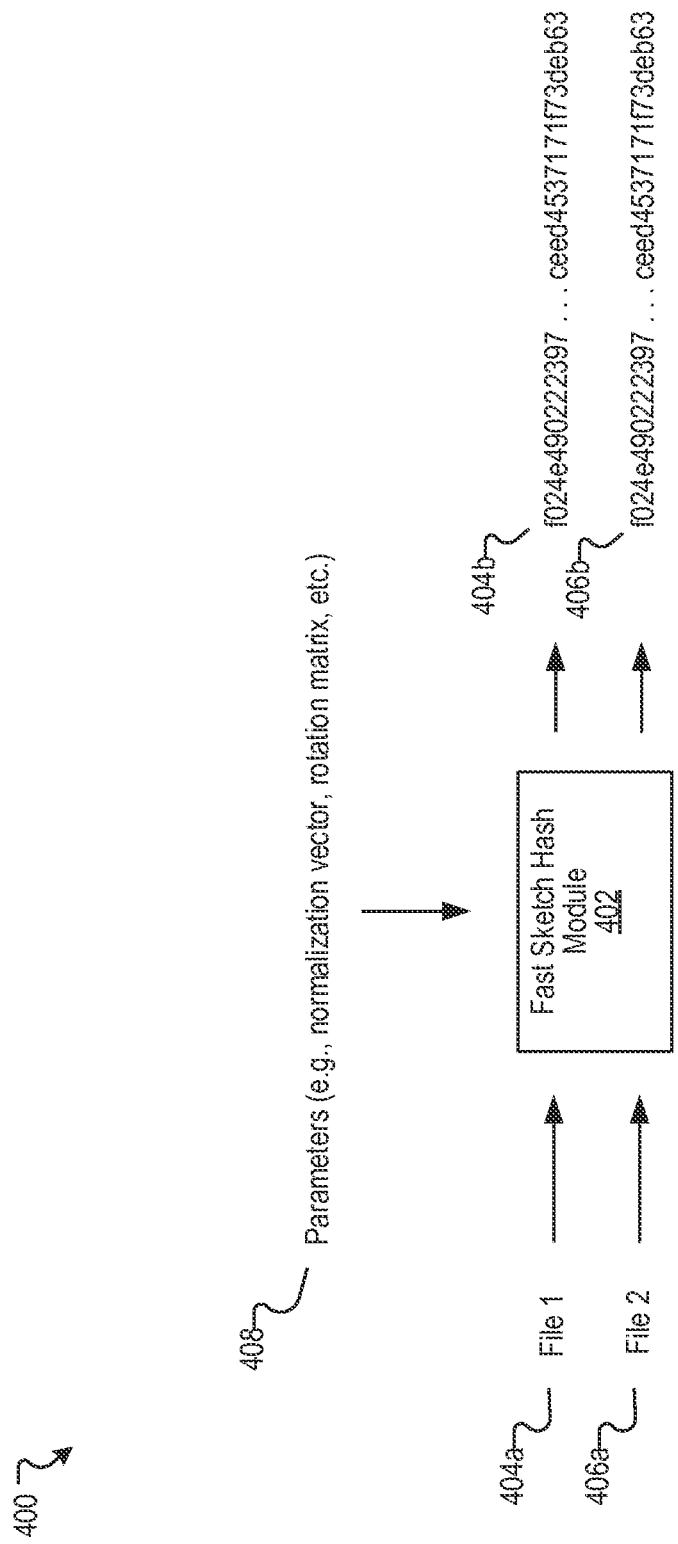
FIG. 4 illustrates an example of a diagram for generating hash values, according to various embodiments of the present disclosure.

FIG. 4 illustrates an example of a diagram 400 for generating hash values, according to various embodiments of the present disclosure. In this example, the diagram 400 includes a fast sketch hash module 402 that is configured to generate hash values for files 404a, 406a, that include executable code (e.g., JavaScript). In some embodiments, the fast sketch hash module 102 of FIG. 1 can be implemented with the fast sketch hash module 402. In the example of FIG. 4, the fast sketch hash module 402 can utilize various parameters 408, such as a normalization vector and rotation matrix, for purposes of generating the hash values 404b, 406b. As mentioned, the normalization vector and the rotation matrix can be generated for determining hash values for a particular type of content item. In this example, the normalization vector and rotation matrix have been determined for generating hash values for content items that include executable code (e.g., JavaScript).

The content item "File 1" 404a is illustrated in FIG. 4 as being provided to the fast sketch hash module 402. The fast sketch hash module 402 can evaluate the content item "File 1" 404a to generate a corresponding hash value 404b. Similarly, the content item "File 2" 406a is illustrated in FIG. 4 as being provided to the fast sketch hash module 402. The fast sketch hash module 402 can also evaluate the content item "File 2" 406a to generate a corresponding hash value 406b. When generating the hash values 404b, 406b, the fast sketch hash module 402 can be configured to generate fuzzy hashes that allow for some discrepancy in the contents of the submitted file. That is, the same hash value 404b, 406b can be generated for two files that are generally similar but not necessarily identical. The resulting hash values 404b, 406b can be evaluated to determine whether the two content items 404a, 406a are similar to one another.

FIG. 5 illustrates an example process 500 for generating a hash value for a content item, according to various embodiments of the present disclosure. In the example of FIG. 5, the content item includes source code which is parsed before generating n-grams for the content item.

As shown in state (A) of FIG. 5, a parse tree 502 can be generated for the content item. In state (B), a count-min sketch (CM sketch) vector 504 can be created using the parse tree 502. In this example, the vector 504 can be generated by utilizing a first hash function and a second hash function to hash the n-grams (e.g., bigrams) generated for the parse tree 502.

For example, the first hash function can be utilized to hash the bigram 506 "Program-Variable Declaration" to an element 510 of the vector 504. Next, the second hash function can be utilized to hash the same bigram 506 to an element 512 of the vector 504. The respective values of the elements 510, 512 can be incremented based on the number of observations of the bigram 506 in the parse tree 502. In this example, the bigram 506 "Program-Variable Declaration" is determined using the parse tree 502 based on a parent-child relationship. As mentioned, depending on the implementation, parent-child and/or sibling relations can be used when generating n-grams for a parse tree. As shown in the parse tree 502, there is one instance of the parent-child relationship "Program-Variable Declaration". As such, the respective values for the elements 510 and 512 are each incremented by one.

In another example, the first hash function can be utilized to hash the bigram 508 "Array Expression-Literal" to the element 512 and the second hash function can be utilized to hash the bigram 508 to an element 514. The respective values of the elements 512 and 514 can be incremented based on the number of observations of the bigram 508 in the parse tree 502. In this example, there are three instances of the bigram 508 "Array Expression-Literal". As such, the respective values for the elements 512 and 514 of the vector 504 are each incremented by three. This process is repeated for each n-gram (e.g., bigram) that is generated for the parse tree 502.

In state (C), the vector 504 has been updated to account for all of the bigrams that were generated for the parse tree 502. State (C) illustrates the process of subtracting the vector 504 by a normalization vector 516. As mentioned, the normalization vector 516 can be predetermined and may correspond to a particular type of content item. The normalized vector 518 can be determined after subtracting the vector 504 by the normalization vector 516.

Next, in state (D), the normalized vector 518 can be multiplied by a rotation matrix 520 to produce a quantized vector 522. As mentioned, the rotation matrix 520 can be predetermined and may correspond to a particular type of content item. The quantized vector 522 will generally include a series of positive and negative digits. In state (E), the quantized vector 522 can be converted to a binarized vector 524 in which any positive values in the quantized vector 522 are converted to ones (1s) and any negative values in the quantized vector 522 are converted to zeros (0s). The binarized vector 524 can then be converted into hexadecimal notation to produce the hash value 526.

Figure 6:
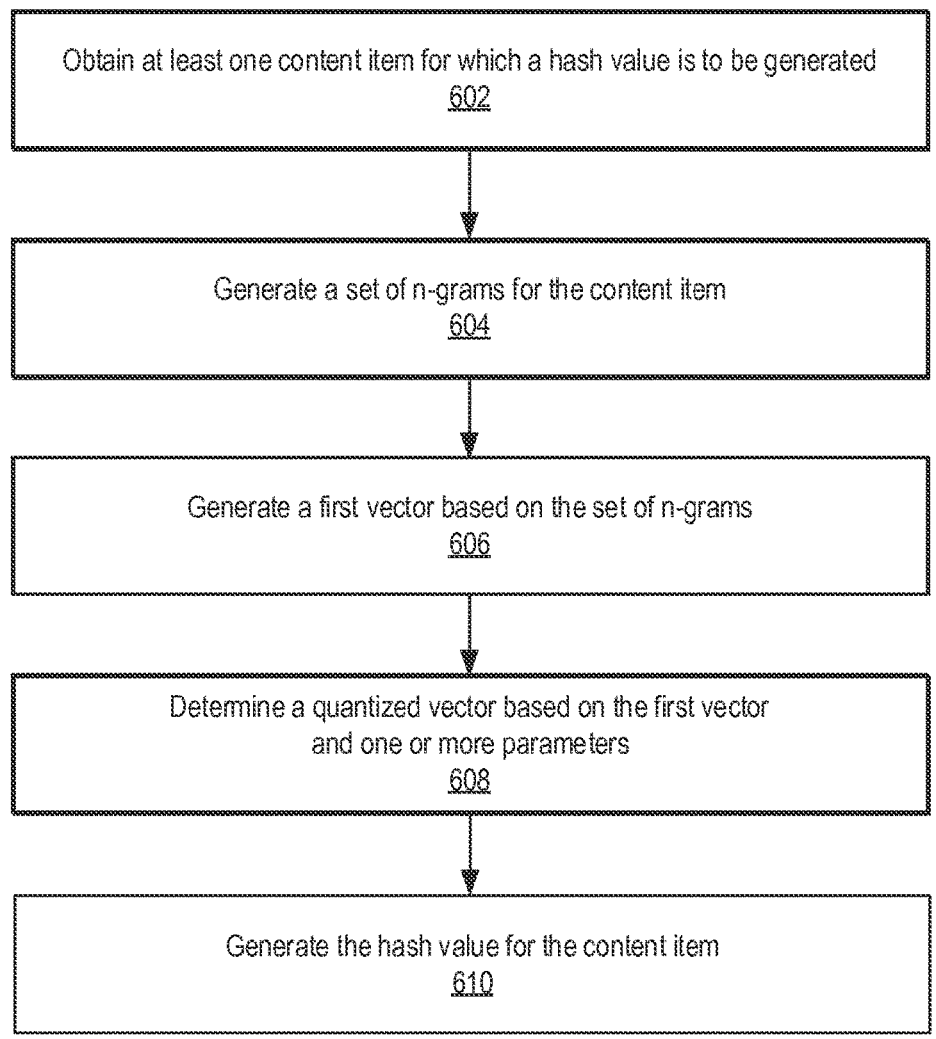
FIG. 6 illustrates an example method for generating hash values, according to an embodiment of the present disclosure.

FIG. 6 illustrates an example method for generating hash values, according to an embodiment of the present disclosure. It should be appreciated that there can be additional, fewer, or alternative steps performed in similar or alternative orders, or in parallel, within the scope of the various embodiments discussed herein unless otherwise stated.

At block 602, the example method 600 can obtain a content item for which a hash value is to be generated. At block 604, the method 600 can generate a set of n-grams for the content item. In some embodiments, content items that include structured content (e.g., source code) are parsed to generate a parse tree and the set of n-grams for the content item are determined using the parse tree. At block 606, the method 600 can generate a first vector based on the set of n-grams. In some embodiments, the first vector is implemented as a count-min sketch data structure. At block 608, the method 600 can determine a quantized vector based on the first vector and one or more parameters. In various embodiments, the quantized vector is determined based on a normalization vector and corresponding rotation matrix. At block 610, the method 600 can generate the hash value for the content item.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
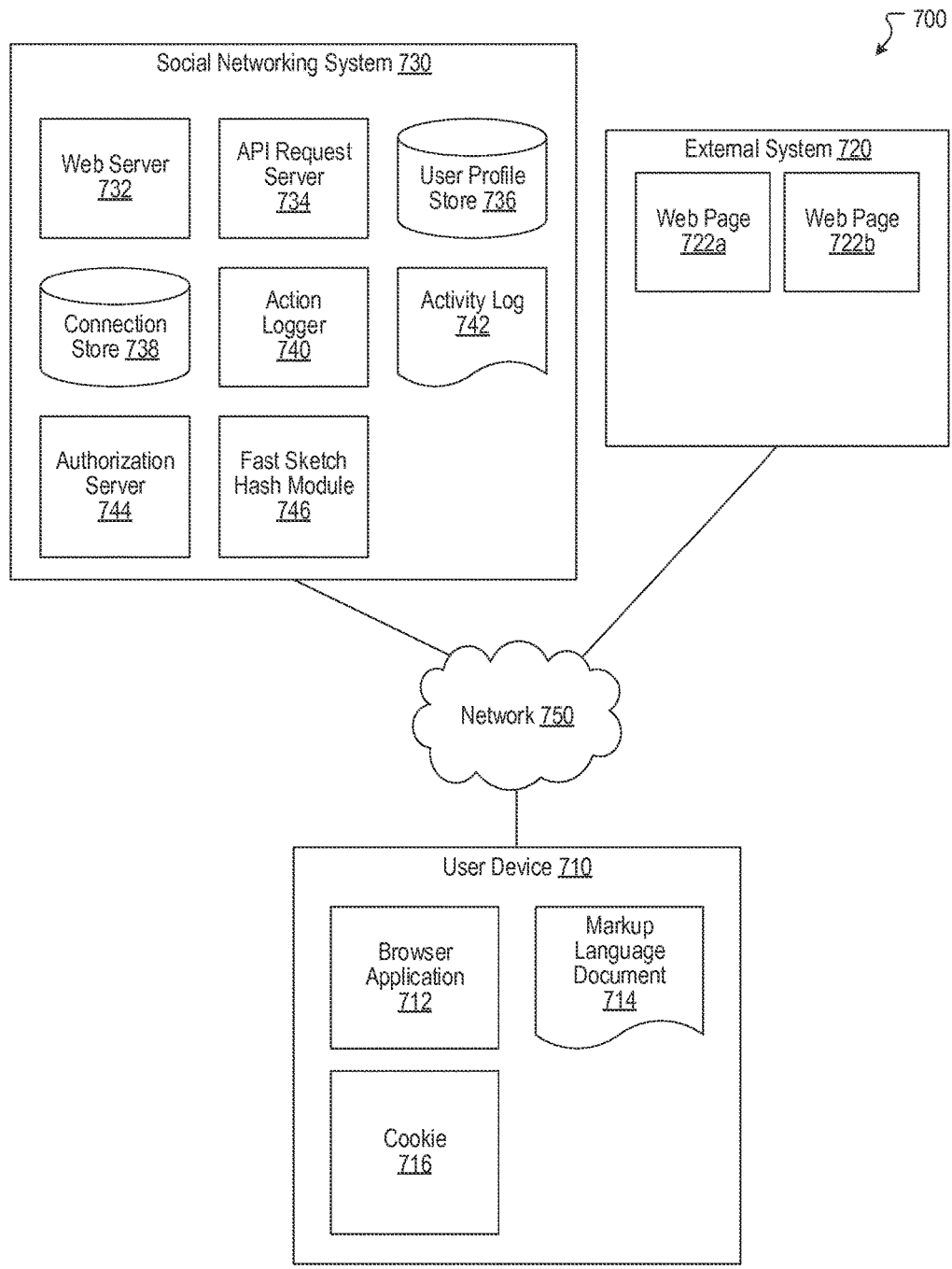
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content. As discussed previously, it should be appreciated that there can be many variations or other possibilities.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities.

The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a fast sketch hash module 746. The fast sketch hash module 746 can, for example, be implemented as the fast sketch hash module 102 of FIG. 1. As discussed previously, it should be appreciated that there can be many variations or other possibilities.

Hardware Implementation

Figure 8:
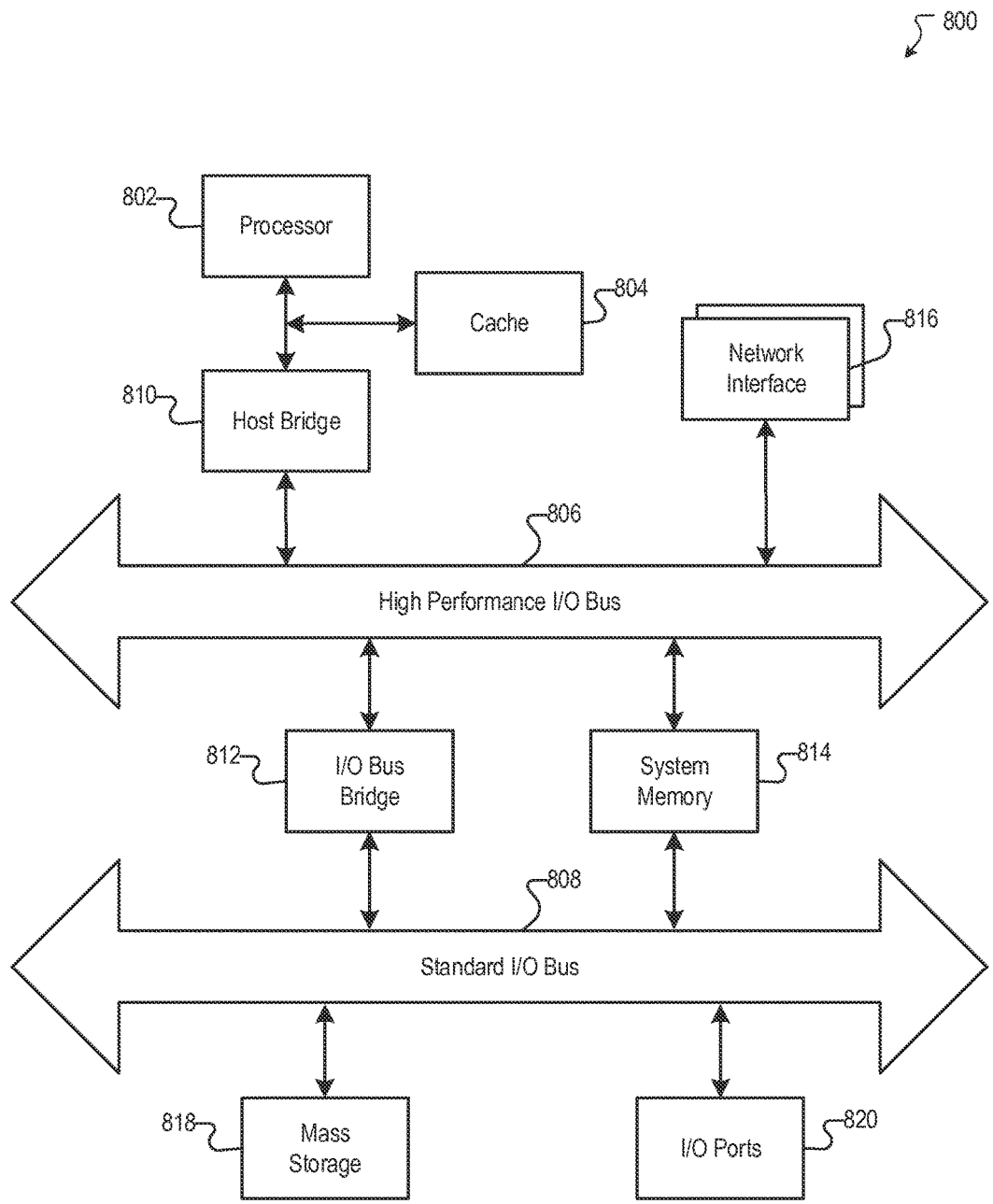
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    obtaining, by a computing system, at least one content item for which a hash value is to be generated;
    generating, by the computing system, a set of n-grams based at least in part on the at least one content item;
    generating, by the computing system, a first vector that includes a set of elements based at least in part on the set of n-grams, wherein the set of elements maintain respective counts of n-grams in the set of n-grams, and wherein the first vector is a count-min sketch (CM sketch) vector that is associated with at least one hash function;
    determining, by the computing system, a quantized vector based at least in part on the first vector and one or more parameters; and
    generating, by the computing system, the hash value for the at least one content item based at least in part on the quantized vector, wherein the hash value is a similarity-preserving hash value, and wherein the hash value for the content item is able to be compared with a similarity-preserving hash value generated for a different content item to determine an amount of similarity between the content item and the different content item.

2. The computer-implemented method of claim 1, wherein generating, by the computing system, the set of n-grams further comprises:
    determining, by the computing system, that the at least one content item includes structured content;
    generating, by the computing system, a parse tree based at least in part on the content item; and
    determining, by the computing system, the set of n-grams based at least in part on the parse tree.

3. The computer-implemented method of claim 1, wherein generating, by the computing system, the first vector based at least in part on the set of n-grams further comprises:
hashing, by the computing system, each n-gram in the set of n-grams to at least one element in the CM sketch vector using the at least one hash function; and
incrementing, by the computing system, a respective value corresponding to the at least one element based at least in part on a number of occurrences of the n-gram in the content item.

4. The computer-implemented method of claim 1, wherein determining, by the computing system, the quantized vector based at least in part on the first vector and the one or more parameters further comprises:
determining, by the computing system, a normalized vector based at least in part on the first vector and at least one normalization vector; and
modifying, by the computing system, the normalized vector based at least in part on at least one a rotation matrix.

5. The computer-implemented method of claim 4, wherein determining, by the computing system, the normalized vector further comprises:
determining, by the computing system, the normalized vector by subtracting the first vector by the at least one normalization vector.

6. The computer-implemented method of claim 4, wherein modifying, by the computing system, the normalized vector further comprises:
multiplying, by the computing system, the normalized vector by the at least one rotation matrix.

7. The computer-implemented method of claim 1, wherein generating, by the computing system, the hash value for the at least one content item further comprises:
determining, by the computing system, a binarized vector based at least in part on the quantized vector; and
converting, by the computing system, the binarized vector to hexadecimal notation.

8. The computer-implemented method of claim 1, wherein determining, by the computing system, the binarized vector further comprises:
modifying, by the computing system, a respective value for each element in the quantized vector having a positive value to 1; and
modifying, by the computing system, a respective value for each element in the quantized vector having a negative value to 0.

9. The computer-implemented method of claim 1, further comprising:
determining, by the computing system, that the hash value for the content item matches a hash value generated for a different content item; and
determining, by the computing system, that the content item and the different content item contain similar content or structured content.

10. The computer-implemented method of claim 1, wherein the at least one content item is one of: a string, source code, object code, bytecode, machine code, structured content, text file, binary file, system file, software program, program file, or executable file.

11. A system comprising:
at least one processor; and
a memory storing instructions that, when executed by the at least one processor, cause the system to perform:
obtaining at least one content item for which a hash value is to be generated;
generating a set of n-grams based at least in part on the at least one content item;
generating a first vector that includes a set of elements based at least in part on the set of n-grams, wherein the set of elements maintain respective counts of n-grams in the set of n-grams, and wherein the first vector is a count-min sketch (CM sketch) vector that is associated with at least one hash function;
determining a quantized vector based at least in part on the first vector and one or more parameters; and
generating the hash value for the at least one content item based at least in part on the quantized vector, wherein the hash value is a similarity-preserving hash value, and wherein the hash value for the content item is able to be compared with a similarity-preserving hash value generated for a different content item to determine an amount of similarity between the content item and the different content item.

12. The system of claim 11, wherein generating the set of n-grams further causes the system to perform:
determining that the at least one content item includes structured content;
generating a parse tree based at least in part on the content item; and
determining the set of n-grams based at least in part on the parse tree.

13. The system of claim 11, wherein generating the first vector based at least in part on the set of n-grams further causes the system to perform:
hashing each n-gram in the set of n-grams to at least one element in the CM sketch vector using the at least one hash function; and
incrementing a respective value corresponding to the at least one element based at least in part on a number of occurrences of the n-gram in the content item.

14. The system of claim 11, wherein determining the quantized vector based at least in part on the first vector and the one or more parameters further causes the system to perform:
determining a normalized vector based at least in part on the first vector and at least one normalization vector; and
modifying the normalized vector based at least in part on at least one a rotation matrix.

15. The system of claim 11, wherein determining the normalized vector further causes the system to perform:
determining the normalized vector by subtracting the first vector by the at least one normalization vector.

16. A non-transitory computer-readable storage medium including instructions that, when executed by at least one processor of a computing system, cause the computing system to perform a method comprising:
obtaining at least one content item for which a hash value is to be generated;
generating a set of n-grams based at least in part on the at least one content item;
generating a first vector that includes a set of elements based at least in part on the set of n-grams, wherein the set of elements maintain respective counts of n-grams in the set of n-grams, and wherein the first vector is a count-min sketch (CM sketch) vector that is associated with at least one hash function;
determining a quantized vector based at least in part on the first vector and one or more parameters; and
generating the hash value for the at least one content item based at least in part on the quantized vector, wherein the hash value is a similarity-preserving hash value, and wherein the hash value for the content item is able to be compared with a similarity-preserving hash value generated for a different content item to determine an amount of similarity between the content item and the different content item.

17. The non-transitory computer-readable storage medium of claim 16, wherein generating the set of n-grams causes the computing system to perform:
    determining that the at least one content item includes structured content;
    generating a parse tree based at least in part on the content item; and
    determining the set of n-grams based at least in part on the parse tree.

18. The non-transitory computer-readable storage medium of claim 16, wherein generating the first vector based at least in part on the set of n-grams causes the computing system to perform:
    hashing each n-gram in the set of n-grams to at least one element in the CM sketch vector using the at least one hash function; and
    incrementing a respective value corresponding to the at least one element based at least in part on a number of occurrences of the n-gram in the content item.

19. The non-transitory computer-readable storage medium of claim 16, wherein determining the quantized vector based at least in part on the first vector and the one or more parameters causes the computing system to perform:
    determining a normalized vector based at least in part on the first vector and at least one normalization vector; and
    modifying the normalized vector based at least in part on at least one a rotation matrix.

20. The non-transitory computer-readable storage medium of claim 16, wherein determining the normalized vector causes the computing system to perform:
    determining the normalized vector by subtracting the first vector by the at least one normalization vector.

* * * * *